(12) United States Patent
Cope et al.

(10) Patent No.: US 7,394,173 B2
(45) Date of Patent: Jul. 1, 2008

(54) DIRECT DRIVE CONTROLLER WITH HAPTIC FEEDBACK

(75) Inventors: David Cope, Medfield, MA (US); Andrew Wright, Boston, MA (US); Neil Tischler, Acton, MA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 300 days.

(21) Appl. No.: 10/635,318

(22) Filed: Aug. 6, 2003

(65) Prior Publication Data

US 2004/0027332 A1     Feb. 12, 2004

Related U.S. Application Data

(60) Provisional application No. 60/401,549, filed on Aug. 6, 2002.

(51) Int. Cl.
| | |
|---|---|
| *G06F 3/033* | (2006.01) |
| *G05G 9/047* | (2006.01) |
| *H02K 26/00* | (2006.01) |
| *A63F 13/02* | (2006.01) |
| *G06K 11/00* | (2006.01) |

(52) U.S. Cl. ............................. 310/15; 345/161; 310/12
(58) Field of Classification Search .................. 310/15; 345/161
See application file for complete search history.

(56) References Cited

U.S. PATENT DOCUMENTS

| | | | | |
|---|---|---|---|---|
| 4,260,035 A | 4/1981 | Loveless et al. | ............... | 180/6.5 |
| 4,401,986 A | 8/1983 | Trenkler et al. | ........ | 340/870.32 |
| 4,507,639 A | 3/1985 | Trenkler et al. | ............. | 336/115 |
| 4,584,577 A | 4/1986 | Temple | ........................ | 340/870 |
| 4,639,667 A | 1/1987 | Andresen | .................... | 324/208 |
| 4,651,130 A | 3/1987 | Pennell | ........................ | 340/347 |
| 4,719,381 A * | 1/1988 | Miles | ........................ | 310/166 |
| 4,733,214 A | 3/1988 | Andresen | .................... | 338/128 |
| 4,908,558 A * | 3/1990 | Lordo et al. | ................. | 318/648 |
| 5,929,846 A | 7/1999 | Rosenberg et al. | .......... | 345/161 |

(Continued)

FOREIGN PATENT DOCUMENTS

DE     19501439     1/1995

(Continued)

*Primary Examiner*—Burton Mullins
(74) *Attorney, Agent, or Firm*—Hayes Soloway P.C.

(57) ABSTRACT

A reliable and cost-efficient direct drive force feedback motor is suitable for joystick applications, allowing multiple degrees of output freedom, requiring no coil commutation, and permitting compact packaging. A multiple degree-of-freedom motor consistent with the invention comprises an output shaft, a stator, and a rotor. The stator comprises first and second lamination stacks, each lamination stack having an interior curved surface and a coil wound thereon, the lamination stacks being disposed adjacent the output shaft. The rotor is fixed to the output shaft and movably supported adjacent the stator with an air gap disposed between the rotor and the stator, the rotor including at least one magnet disposed thereon and being movable along the interior curved surface of the lamination stacks in directions defining at least first and second degrees of freedom. Energization of the coil of the first lamination stack establishes a first magnetic field to urge the output shaft to rotate in a first plane, and energization of the coil of the second lamination stack establishes a second magnetic field to urge the output shaft to rotate in a second plane substantially orthogonal to the first plane.

47 Claims, 5 Drawing Sheets

U.S. PATENT DOCUMENTS

| | | | |
|---|---|---|---|
| 6,320,284 B1 | 11/2001 | Fontana et al. | 310/12 |
| 6,664,666 B2 * | 12/2003 | Corcoran | 310/12 |
| 7,061,466 B1 * | 6/2006 | Moore et al. | 345/156 |
| 2002/0053849 A1 | 5/2002 | Corcoran | 310/156.01 |

FOREIGN PATENT DOCUMENTS

| | | |
|---|---|---|
| EP | 0938035 | 8/1999 |
| WO | WO 00/25093 | 5/2000 |

* cited by examiner

DIRECT DRIVE CONTROLLER WITH HAPTIC FEEDBACK

CROSS-REFERENCE TO RELATED APPLICATION

This application claims priority to copending U.S. Provisional Patent Application Ser. No. 60/401,549, filed on Aug. 6, 2002, the entire disclosure of which is incorporated herein by reference in its entirety.

BACKGROUND OF THE INVENTION

The present invention relates, generally, to a force feedback motor assembly that provides an output in one or more degrees of freedom for use in joystick and other applications, and more particularly, to an improved force feedback joystick.

Various force feedback motor designs providing multiple degrees of freedom are known in the art for use in a wide variety of applications. For example, multiple degrees of freedom in motor output are particularly useful in linear actuation and positioning applications. Another application in which such motors may be used is in joystick applications for real control of an associated apparatus, e.g., direct control of an aircraft, wheelchair, or other vehicle, or for simulation apparatus control, e.g. video games, flight simulation, virtual reality simulation, etc. In these applications a control system may be provided for sensing a user's manipulation of a joystick, i.e., the motor output shaft, and providing a signal for controlling the application.

Many applications also require force or tactile ("haptic") feedback to the user. The need for the user to obtain realistic tactile information and experience tactile sensation is extensive in many kinds of simulation and other applications. For example, in medical/surgical simulations, the "feel" of a probe or scalpel simulator is important as the probe is moved within the simulated body. It would be invaluable to a medical trainee to learn how an instrument moves within a body, how much force is required depending on the operation performed, the space available in a body to manipulate an instrument, etc. In simulations of vehicles or equipment, force feedback for controls such as a joystick can be necessary to realistically teach a user the force required to move the joystick when steering in specific situations, such as in a high acceleration environment of an aircraft. Alternatively, when actually operating in a high acceleration vehicle environment, the force feedback can be used to counteract the effect of the acceleration induced forces on the hand and thus improve controllability and safety of the vehicle. In virtual world simulations where the user can manipulate objects, force feedback is necessary to realistically simulate physical objects; for example, if a user touches a pen to a table, the user should feel the impact of the pen on the table. An effective human/computer interface, such as a joystick, not only acts as an input device for tracking motion, but also as an output device for producing realistic tactile sensations. An interface that accurately responds to signals having fast changes and a broad range of frequencies as well as providing such signals accurately to a control system, is therefore desirable in these and other applications.

In addition, there is a desire to provide force feedback to users of computer systems in the entertainment industry. Joysticks and other interface devices can be used to provide force feedback to a user playing a video game or experiencing a simulation for entertainment purposes. Through such an interface device, a computer system can convey to the user the physical sensation of colliding into a wall, moving through a liquid, driving over a bumpy road, and other sensations. The user can thus experience an entire sensory dimension in the gaming experience that was previously absent. Force feedback interfaces can provide a whole new modality for human-computer interaction.

In typical multi-degree of freedom apparatuses that are capable of providing force feedback, there are several disadvantages. Generally conventional devices are cumbersome and complex mechanisms that are difficult and expensive to manufacture. In particular, the use of a transmission between the actuator motor and the joystick reduces the performance of the device and reduces the reliability and life of the device. Many transmission types can fail in a manner that renders the device unusable. For industrial and military applications, reliability and maintenance concerns are sometimes linked to the safety of personnel. If a force feedback device is not reliable or failsafe, then its use in these applications may be restricted or prevented even though the force feedback capability would enhance the performance and safety for that application.

In consumer markets, low-cost is highly desirable. For example, personal computers for the home consumer are becoming powerful and fast enough to provide force feedback to the typical mass-market consumer. A need is thus arising to be able to manufacture and market force feedback interfaces as cheaply and as efficiently as possible. The cost, complexity, reliability, and size of a force feedback interface for home use should be practical enough to mass-produce the devices. In addition, aesthetic concerns such as compactness and operating noise level of a force feedback device are of concern in the home market. Since the prior art feedback interfaces are mainly addressed to specific applications in industry, most force feedback mechanisms are costly, large, heavy, are easily broken, have significant power requirements, and are difficult to program for applications. The prior art devices require high-speed control signals from a controlling computer for stability, which usually requires more expensive and complex electronics. In addition, the prior art devices are typically large and noisy. These factors provide many obstacles to the would-be manufacturer of force-feedback interfaces to the home computer market.

Moreover, DC (direct current) motors, which are commonly used in prior art devices, suffer from several disadvantages that make them unsuitable for many applications. For example, DC motors do not have inherent positional control and require additional sensors (e.g., optical) to determine the position of the rotor. Such sensors may malfunction because of dust or wear particles created by the mechanical braking system. This can have a negative effect on achieving the accuracy and precision of movement required in certain applications. DC motors also lack braking control and must incorporate additional mechanisms, such as gearing, clutches, and a solenoid brake to control speed and/or stop the rotor in desired positions. These additional components increase the mechanical complexity of the system and are susceptible to wear and tear. Thus, the reliability of a DC motor system is frequently an issue.

Accordingly, there is a need in the art for a reliable motor allowing output in multiple degrees of freedom and capable of providing force feedback that may be efficiently and cost-effectively produced.

SUMMARY OF THE INVENTION

The present invention provides a reliable and cost-efficient direct drive (i.e., no transmission subsystem) force feedback motor suitable for joystick applications, allowing multiple degrees of output freedom, requiring no coil commutation, and permitting compact packaging.

In one aspect, a multiple degree-of-freedom motor consistent with the invention comprises an output shaft, a stator, and a rotor. The stator comprises first and second lamination stacks, each lamination stack having an interior curved surface and a coil wound thereon, the lamination stacks being disposed adjacent the output shaft. The rotor is fixed to the output shaft and movably supported adjacent the stator with an air gap disposed between the rotor and the stator, the rotor including at least one magnet disposed thereon and being movable along the interior curved surface of the lamination stacks in directions defining at least first and second degrees of freedom. Energization of the coil of the first lamination stack establishes a first magnetic field to urge the output shaft to rotate in a first plane, and energization of the coil of the second lamination stack establishes a second magnetic field to urge the output shaft to rotate in a second plane substantially orthogonal to the first plane. The first degree of freedom may be substantially perpendicular to a longitudinal axis of wires of one of the coils associated with the first degree of freedom, and the second degree of freedom may be substantially perpendicular to a longitudinal axis of wires of the other of the coils. The interior curved surface may substantially define at least a portion of a sphere or may be uniformly curved, and may have a plurality of slots formed therein. The slots may lie in planes substantially parallel to one another. At least one lamination stack may comprise a plurality of laminations radially disposed about a center point, with a plane of each lamination extending through the center point. At least one lamination stack may have an interior curved surface with no slots formed therein. At least one magnet may be a permanent magnet, and the magnet may be faceted. The output shaft may also be an input shaft, and the motor may further comprise at least one sensor for detecting movement of the input shaft. A cooling fan may further be provided. A universal serial bus communications interface may be included for providing input and/or output signals to detect and/or control the position of the output shaft. The stator may further comprise a third lamination stack having an interior curved surface and a coil wound thereon, wherein the rotor includes at least one magnet disposed thereon and is movable along the interior curved surface of the third lamination stack in a direction defining a third degree of freedom. In this configuration, energization of the coil of the third lamination stack establishes a third magnetic field to urge the output shaft to rotate in a third plane substantially orthogonal to each of the first and second planes.

In another aspect, a multiple degree-of-freedom motor consistent with the invention comprises an output shaft, first and second stator coils disposed adjacent the output shaft, and a rotor fixed to the output shaft and movably supported adjacent the stator coils with an air gap disposed between the rotor and the stator coils. The rotor includes at least one magnet disposed thereon and is movable in directions defining at least first and second degrees of freedom. Energization of the first stator coil establishes a first magnetic field to urge the output shaft to rotate in a first plane, and energization of the second stator coil establishes a second magnetic field to urge the output shaft to rotate in a second plane substantially orthogonal to the first plane. The first degree of freedom may be substantially perpendicular to a longitudinal axis of wires of the first stator coil associated with the first degree of freedom, and the second degree of freedom may be substantially perpendicular to a longitudinal axis of wires of the second stator coil. At least one magnet may be a permanent magnet, and the magnet may be faceted. The output shaft may also be an input shaft, and at least one sensor may be provided for detecting movement of the input shaft. The stator may further comprise a third coil. In this configuration, the rotor includes at least one magnet disposed thereon and is movable in a direction defining a third degree of freedom, and energization of the third stator coil establishes a third magnetic field to urge the output shaft to rotate in a third plane substantially orthogonal to each of the first and second planes.

In a further aspect, a method of moving an output shaft in multiple degrees of freedom comprises: disposing first and second stator coils adjacent the output shaft; fixing a rotor to the output shaft, the rotor being movably supported adjacent the stator coils with an air gap disposed between the rotor and the stator coils, the rotor including at least one magnet disposed thereon and being movable in directions defining at least first and second degrees of freedom; and urging the output shaft to rotate in one of a first and second plane by respectively energizing the first or second stator coil, wherein the energization of the respective stator coils establishes magnetic fields to urge the output shaft to rotate in planes substantially orthogonal to one another. The method may further comprise: disposing a third stator coil adjacent the output shaft; fixing the rotor so as to include at least one magnet disposed thereon and being movable in a direction defining a third degree of freedom; and urging the output shaft to rotate in a third plane by energizing the third stator coil, wherein the energization of the third stator coil establishes a third magnetic field to urge the output shaft to rotate in a third plane substantially orthogonal to each of the first and second planes.

In still another aspect, a lamination stack for use in a stator of a motor having an output shaft comprises a plurality of laminations stacked flat against one another and parallel to one another, wherein the laminations near the edge of the stack are disposed slightly closer to the output shaft to form a stepped concave surface about the longitudinal axis of the output shaft in a plane orthogonal to a side surface of the plurality of laminations. The shape of the stepped concave surface of the plurality of laminations about an equator of the plurality of laminations may approximate an arc having a constant radius in a plane orthogonal to a side surface of the plurality of laminations.

In yet another aspect, a multiple degree-of-freedom motor comprises an output shaft, a rotor coupled to the output shaft, and a stator comprising a first lamination stack and a second lamination stack, the lamination stacks disposed perpendicular to one another, each lamination stack having a curved interior surface and a coil wound thereon. The laminations of the first lamination stack and second lamination stack may be substantially parallel to one another. Energization of the coil of the first lamination stack may establish a first magnetic field to urge the output shaft to rotate in a first plane, and energization of the coil of the second lamination stack may establish a second magnetic field to urge the output shaft to rotate in a second plane. The stator may further comprise a third lamination stack having an interior curved surface and a coil wound thereon, wherein the laminations of the first and second lamination stacks are substantially perpendicular to the laminations of the third lamination stack, and wherein energization of the coil of the third lamination stack establishes a third magnetic field to urge the output shaft to rotate in a third plane substantially orthogonal to the first and second planes.

DETAILED DESCRIPTION OF THE EMBODIMENTS

With reference now to FIGS. 1 through 4, there is shown an exemplary embodiment of a motor assembly 10 consistent with the invention. In the illustrated embodiment, the assembly 10 is configured for operation as a joystick, which may provide force feedback to a user through the joystick handle 20. However, a motor assembly 10 consistent with the invention may be used in a wide variety of applications. The descriptions provided herein relate to use of an assembly in a joystick configuration are provided, therefore, by way of illustration but not of limitation.

Figure 1:
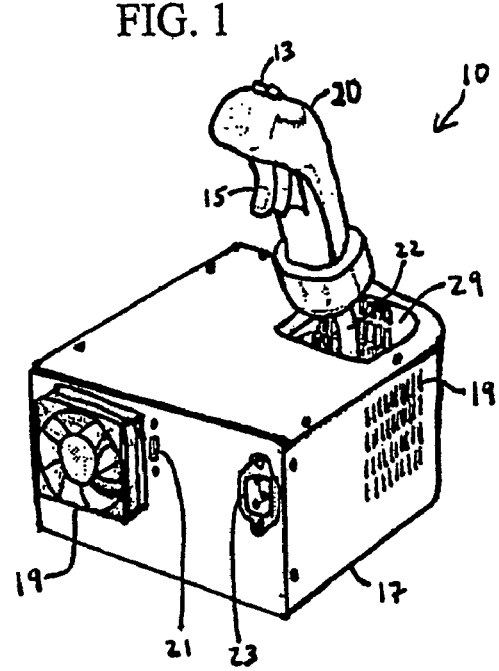
FIG. 1 is a rear perspective view of one embodiment of an exemplary motor assembly consistent with the invention.

As shown in FIG. 1, in one exemplary embodiment, the assembly 10 generally includes a housing 17 having a plurality of ventilation apertures 19 formed therein. The housing 17 contains control circuitry (not shown in FIG. 1) for a moving joystick handle 20, a cooling fan 19, a communications interface port 21, and a power supply interface port 23. The moving joystick handle 20 projects from and is coupled to a shaft 22 disposed within an opening 29 in the housing 17 and may have disposed therein or thereon one or more buttons or switches, e.g., thumb buttons 13 or a trigger 15. The handle 20 and shaft 22 may serve as either an input device, an output device, or both.

The joystick handle 20 preferably has a grip as low as possible (i.e., as close to the housing 17 as possible), as it is anticipated that motor assemblies consistent with the invention may be utilized in physically small spaces and/or may be disposed at both the left- and right-hand sides of a user.

Figure 2:
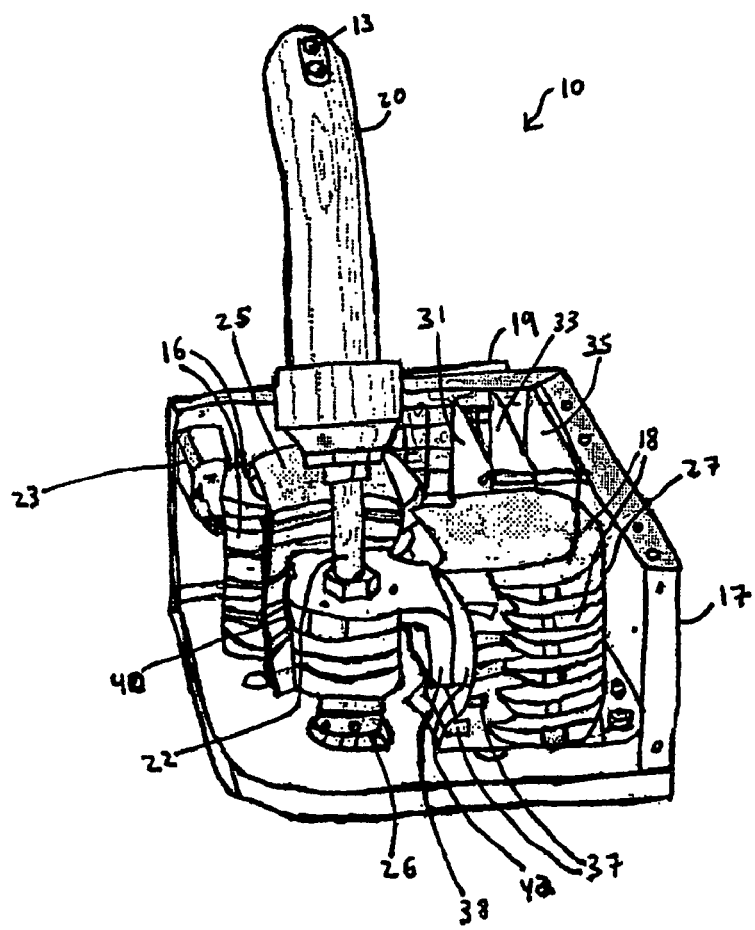
FIG. 2 is a front perspective sectional view of the interior of the exemplary motor assembly of FIG. 1.
Figure 3:
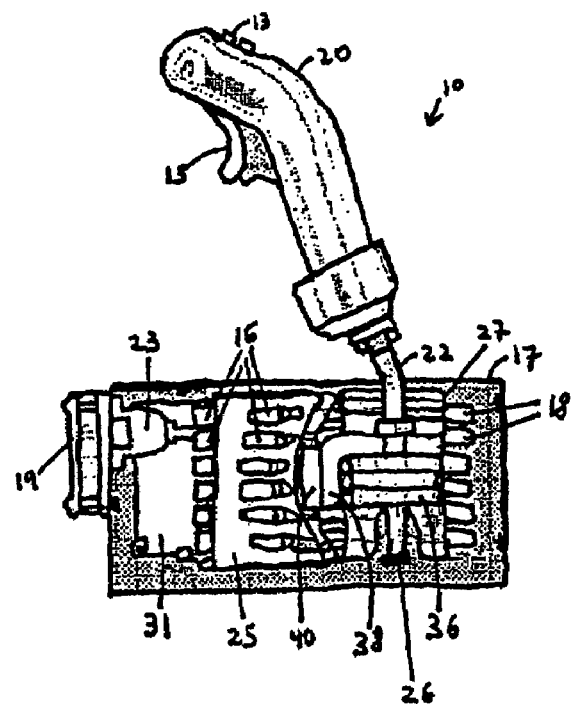
FIG. 3 is a side elevational sectional view of the interior of the exemplary motor assembly of FIG. 1.
Figure 4:
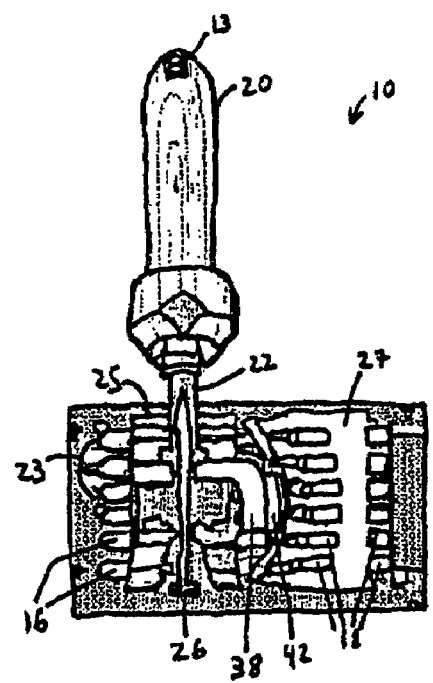
FIG. 4 is a front elevational sectional view of the interior of the exemplary motor assembly of FIG. 1.

With reference now to FIGS. 2-4, a pair of lamination stacks 25, 27 defines the stator of the motor. Each of the lamination stacks 25, 27 contains at least one respective coil 16, 18 configured to carry electrical current provided from a power supply (not shown), e.g., connected via the power supply interface port 23 and cards 31, 33, and 35.

The lamination stacks may have spherical or pseudo-spherical inner surfaces (i.e., the surfaces facing the handle 20) with parallel horizontal slots 37, as shown in FIG. 2. In this configuration, a plurality of laminations, preferably identical, are all stacked flat against each other (parallel to each other) and the laminations near the edge of the stack are disposed slightly closer to the shaft 22 of the handle 20 to form a stepped concave surface about the longitudinal axis of the output shaft 22 in a plane orthogonal to a side surface of the plurality of laminations. The laminations may be spaced by an insulator. The shape of the stepped concave surface of the plurality of laminations about an equator of the plurality of laminations approximates an arc having a constant radius in a plane orthogonal to a side surface of the plurality of laminations. The use of the laminations arranged in such a manner results in an inner stator surface that is almost, but not quite spherical (thus, the term pseudo-spherical). This arrangement maintains an air gap that is almost, but not quite, constant which is advantageous to motor operation. This pseudo-spherical design also provides advantages in terms of manufacturing ease.

Figure 5A:
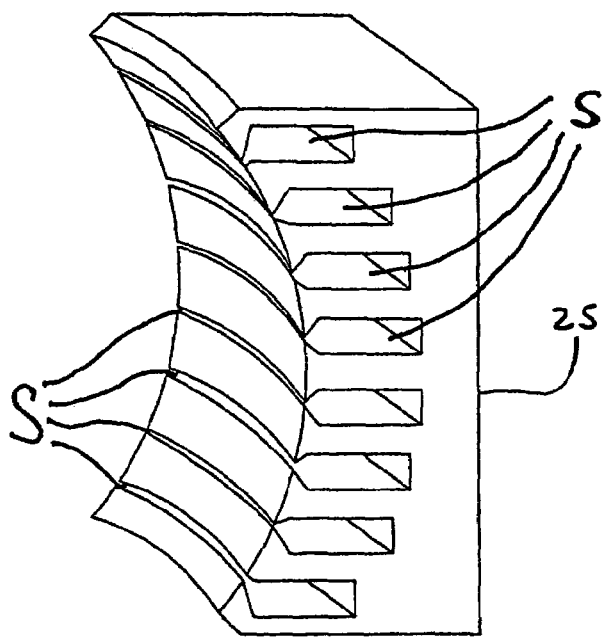
FIG. 5A is a side elevational view of an exemplary lamination stack comprising a plurality of parallel horizontally-oriented slots, in one embodiment of an exemplary motor assembly consistent with the invention.
Figure 5B:
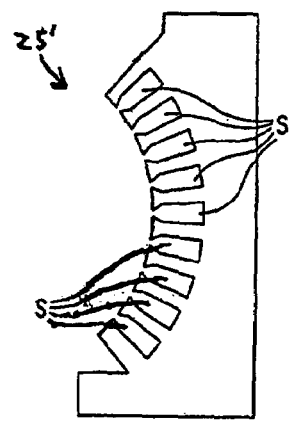
FIG. 5B is a side elevational view of an exemplary lamination stack comprising a plurality of radially-oriented slots, in one embodiment of an exemplary motor assembly consistent with the invention.

As illustrated in the exemplary lamination stack of FIG. 5A, the lamination stack 25 may comprise a plurality of parallel horizontally-oriented slots S, in one embodiment. FIG. 5B illustrated an alternative embodiment, in which the lamination stacks 25' comprise a plurality of radially-oriented (rather than parallel) slots, wherein the individual stator laminations of the lamination stacks are oriented radially about the output shaft 22, parallel to the longitudinal axis of the output shaft 22. In this configuration, the lamination stacks may comprise a plurality of laminations radially disposed about a center point, with a plane of each lamination extending through said center point. Each lamination may be separated by one or more wedge-shaped spacers and/or insulators, to make the distance between adjacent laminations greater along the outside surface of the lamination stack than along the inside surface of the lamination stack. These laminations may be all cut identically with an arcuate inner surface perpendicular to the plane of the laminations, as shown in FIG. 5A, and the laminations may have a plurality of radially oriented slots S.

Figure 5C:
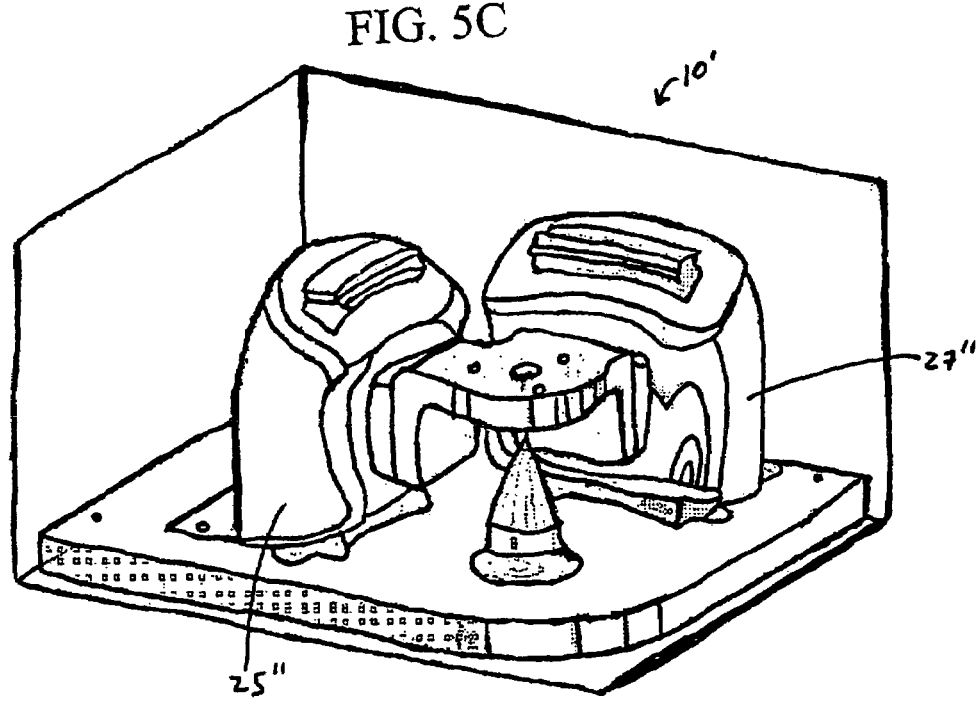
FIG. 5C is a side perspective sectional view of another embodiment of an exemplary motor assembly consistent with the invention, comprising slotless lamination stacks.

As illustrated in FIG. 5C, in another alternative embodiment of the motor assembly 10', the lamination stacks have no slots formed therein. In this embodiment, slotless lamination stacks 25", 27" are employed, since no slots are necessary at all. The result is that cogging due to the permanent magnet can be eliminated in this manner.

Returning now to the illustrated embodiment of FIGS. 2-4, each coil 16, 18 is wound horizontally in a bundle of turns. It is contemplated that there may be greater than 100 turns in each bundle, such that the total number of turns may exceed 600. The coils 16, 18 are wound out the back of each respective lamination stack 25, 27 (away from the handle 20) and have a substantially rectangular cross-section. The coils 16, 18 are disposed substantially orthogonally with respect to one other.

In a joystick application, as shown, the moving joystick handle 20 has a shaft 22 extending from a bottom thereof. The shaft 22 is attached to the housing 17 at a joint 26 so that the shaft may pivot within an opening 29 (shown in FIG. 1) in the housing 17. The joint 26, i.e., the mechanical system to hold the joystick to the base and permit movement in two or more degrees of freedom, may comprise one of several designs, including universal joints, ball joints, and two-degree-of-freedom gimbals. However, universal joints are preferred for use with the system due to their durability, simplicity and widespread use and availability. The described system of constraint serves as a simple embodiment. It is to be understood, however, that a variety of means for constraining the moving components to the desired degrees of freedom may be employed.

Also inside the housing 17 are a plurality of control circuits, e.g., a circuit 31 for controlling and/or detecting a first degree of freedom movement, a circuit 33 for controlling and/or detecting a second degree of freedom movement, and a circuit 35 for interfacing with a computer via a communications port 21, e.g., Universal Serial Bus (USB). The position of the shaft 22 can be sensed by, e.g., potentiometers (not shown) for sensing the displacement of the shaft 22 along each degree of freedom. A variety of means for sensing the rotational position of these elements, and therefore determining the position of the shaft 22 may be employed. However, for cost and simplicity considerations, however, it has been found that potentiometers may be coupled to the shafts to provide varying resistance depending on the position of the shaft. A control application can provide an output signal that varies according to the resistance provided by the potentiometers so that the output of the application is related in a known manner to the position of the shaft. It is to be understood, however, that a variety of means for providing shaft position information may be employed.

The end of the shaft distal from the handle 20 has a plurality of magnets affixed thereto. In the illustrated embodiment, linkage backiron 38 having an "L" shape with its two arms turned down is arranged so that magnets 40 and 42 are disposed on the downward sloping arms of linkage backiron 38. This two-arm rocker design results in a low rotation moment of inertia, thereby being advantageous relative to prior art four-arm rockers or other designs employing transmission systems which magnify the rotational inertia by the transmission ratio squared (raised to the second power). Low mechanical inertia is desirable for high frequency responsiveness. In addition, this feature provides uniform rotational inertia in each degree of freedom thereby attaining uniformity of response.

Figure 9:
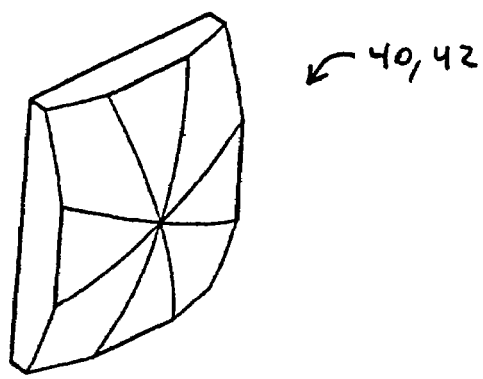
FIG. 9 is an exemplary faceted magnet consistent with the invention.

Magnets 40 and 42 have arcuate outer surfaces substantially parallel to and matching the contours of the respective coils 16, 18 beside which the magnets 40, 42 are disposed. (As used in this specification, an arcuate surface may or may not have a fixed/constant radius.) Thus, an air gap is maintained between the magnets 40, 42 and the respective coils 16, 18, and uniform torque may be provided at all joystick positions if the magnets 40, 42 are constructed so as to have spherical outer surfaces (i.e., the surfaces facing the coils 16, 18). Alternatively, as illustrated in FIG. 9, a relatively small amount of error is introduced by forming angled surfaces on the magnets 40, 42. The error so introduced is of second order in the known mathematical expansion of the description of the surface in terms of the sphere radius. This magnet faceting may result in a substantial decrease in the magnet cost compared to imposing spherical outer surfaces, and may be achieved by breaking off the corners of the magnets to substantially approximate a spherical surface. It should be recognized that it is possible to arrange the magnets in a variety of configurations.

Energization of one or more of the coils 16, 18 produces a force upon corresponding ones of the magnets 40, 42 in either of the two axes perpendicular to the wires in the coils 16, 18. Torque control can then be established for each respective axis by selecting and providing a given polarity (to control direction) and magnitude of current through the coils 16, 18. Advantageously, therefore, the coils 16, 18 may be selectively energized, e.g. in dependence of a control algorithm provided by a user application such as a video game or simulation device or based on the position of the joystick, to provide a force output to the user through the handle 20 via its shaft 22.

In prior art motors, the individual coils are often wound in layers and are commutated so that only those coils most suited to producing the desired forces are selectively activated. In the present invention, there are only two coils 16, 18, and both coils may remain activated full-time, thereby providing slightly less efficiency. However, less supporting circuitry is required than in the prior art, as commutation of the coils as a function of joystick rotor position is not necessary, thereby reducing the cost of fabrication and providing a more compact design.

Thus configured, the assembly 10 can be considered to include a stator defined by the coils 16, 18 and lamination stacks 25, 27, and a rotor defined by the linkage backiron 38 and the magnets 40, 42 positioned on the shaft 22. Ferromagnetic backiron (iron used to complete the flux path and increase the air gap field strength) may be used in one or both of the rotor and the stator in order to assure high performance of the motor by maximizing the magnet coupling between the stator and the rotor. Although the use of backiron is not necessary for motor operation, the use of backiron in the rotor and/or stator efficiently couples the magnetic flux through the magnetic circuit and creates a high force in the motor.

In the embodiment illustrated in FIGS. 2-4, two degrees of freedom are achieved, corresponding to the x- and y-axes in a Cartesian coordinate system. Torque is created at the output of the motor, e.g. the handle 20, by selectively energizing the windings using an internal or external power supply (not shown). By proper well-known mechanical design techniques, it is possible to statically balance the grip and magnet structure and to provide centering for the handle 20.

While in the embodiment illustrated in FIGS. 2-4, the coils 16, 18 are shown as being disposed substantially orthogonally with respect to one another, the angles and sizes of the coils 16, 18 can be adjusted to provide different force capabilities if desired. Any angles of coils for the two axis can be used to provide any desired angles of actuation by controlling the current to each coil such that the net force produced (the vector sum of the forces) is in the desired direction. This remapping of the forces can be performed by on-board circuitry and/or an external computer running appropriate software and may allow a less expensive embodiment to perform a desired task. The substantially orthogonal coil arrangement is the preferred embodiment since it reduces the complexity of the control system.

The coils can be wound using standard winding techniques for copper coils. The coils may be wound on a flat surface or may be press-fit, or heated then press-fit to the desired shape. The windings may also be wound between curved forming plates (not shown), or wound directly onto a form. Also, the windings may be wound so that their positions are adjustable to allow for user adjustment or re-mapping of the motor degrees of freedom. If desired, the stator iron could be formed with teeth in the form of pins and the coils could be laid in the notches between the teeth. This is useful for reducing the magnet size required, but makes manufacturing more complex.

Backiron used in the invention may be fabricated using laminations in order to achieve improved frequency response operation and reduced eddy current heating losses. Lamination stock of suitable thickness for high frequency response is commercially available from numerous commercial vendors. Also, any of the magnets described herein may be provided as electromagnets, or, as shown, permanent magnets, due to cost and performance considerations.

In operation, the permanent magnets create magnetic flux, B, which couples through the current, I, in the stator windings (or coils) of active length, L. This creates a force F (or torque T, if a rotational geometry is used) according to the Lorentz force law, $F=I \times L \times B$, $T=r \times F$.

For use as a joystick, the motor may be used, e.g., in a simulator application (in which the user controls a simulated device such as a computer game or a flight simulator) or a real control application, wherein the user is either controlling a machine, vehicle or other such device. In addition, it will be recognized that the motor can be used for a variety of positioning tasks, for example, the motor could be used as a mirror control for precise control about the x- and y-axes. The control for these two exemplary applications can be arranged as conceptually described below and illustrated in block diagram form in FIGS. 6 and 7.

Figure 6:
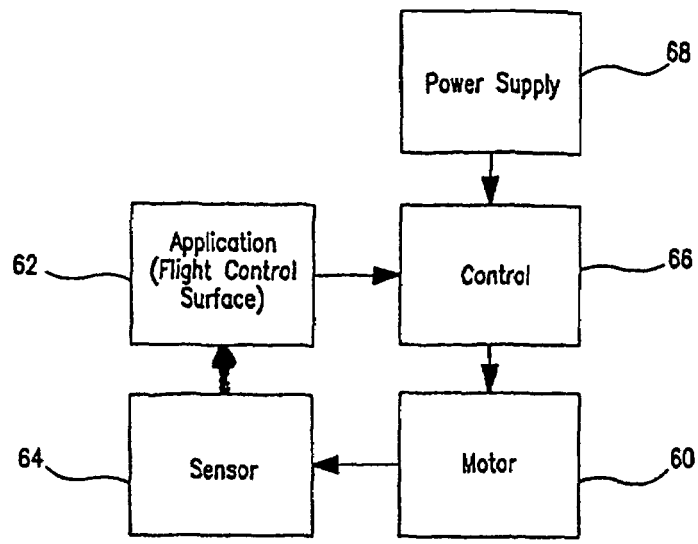
FIG. 6 is a block diagram of an exemplary control scheme for an actuator control application for a motor assembly consistent with the invention.

With reference to FIG. 6, there is shown a functional block diagram identifying a control scheme for a motor consistent with the invention in an actuator application. A motor 60 consistent with the invention may include a component that is actuated by a user or machine. For example, the motor 60 may control the position of a mirror, a control surface, (such as the tail of a dart or aircraft), or a robotic surgical device. The position of the component may be sensed by potentiometers, for example, and output to a control application 62 for causing real time control of the apparatus. For example, the application may cause corresponding modification of an aircraft pitch and/or roll based on the motor position.

The modified position of the apparatus may be sensed by a sensor 64, processed by the controlling application 62 and provided to a feedback control 66 for providing control of the motor 60 in dependence of the new position. Power supply 68 provides power to the entire system.

Figure 7:
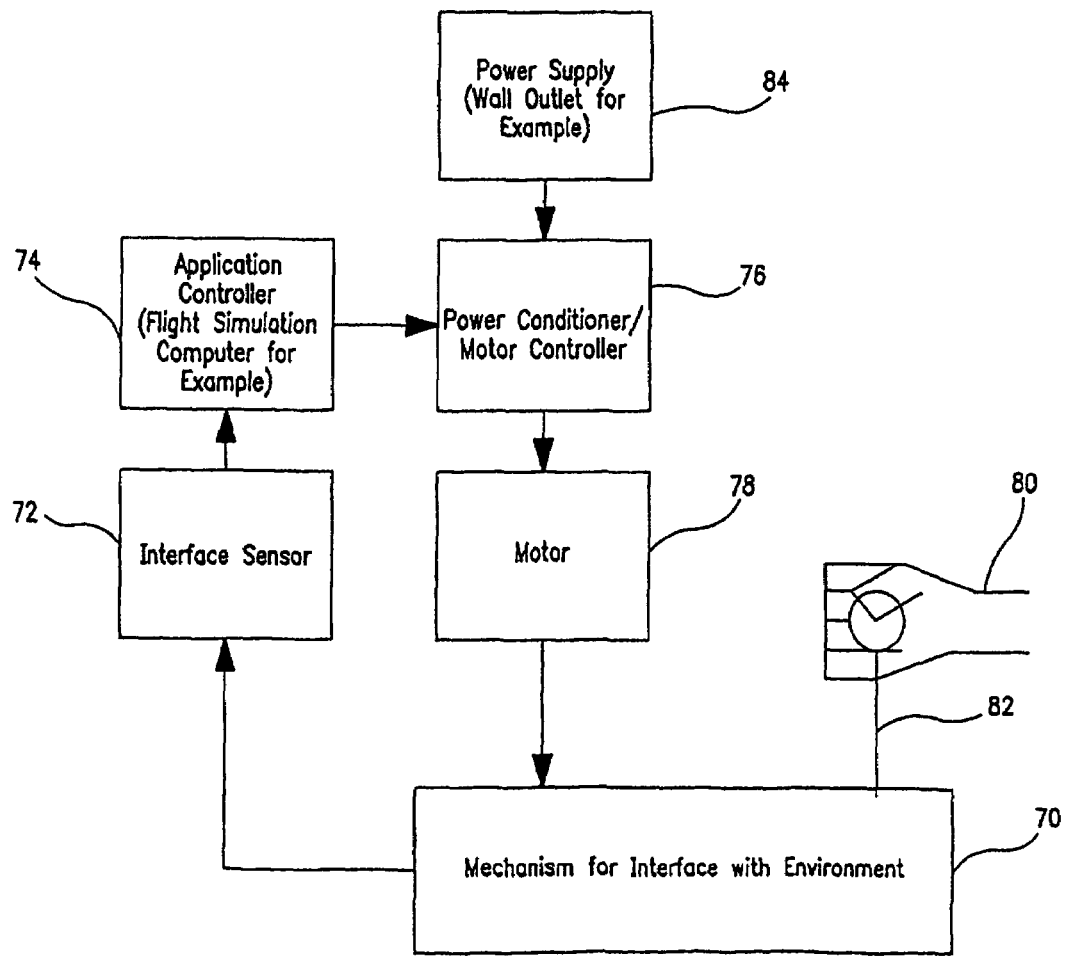
FIG. 7 is a block diagram of an exemplary control scheme for a simulation control application for a motor assembly consistent with the invention.

Turning now to FIG. 7, there is shown a control scheme for use of a motor 78 consistent with the invention in a simulator or generalized application including actual control of a device, vehicle, or aircraft. As shown, manipulation of a joystick handle 82 or other interface by a user's hand 80 with respect to the environment 70 is sensed by an interface sensor 72, which may include, for example, potentiometers for sensing the position of the handle 20 of a control stick with respect to the x- and y-axes. The position sensed by sensor 72 is provided as an input to an application controller 74. The application controller may, for example, be a flight simulation computer running software for a simulation program. The output of the controller 74 is provided to a power conditioner/motor controller 76 which provides an output to a motor 78 consistent with the invention to energize the motor coils and provide an output force to the user 80 through the joystick handle 82 in the manner described above. The power supply 84 provides power to the entire system.

Figure 8:
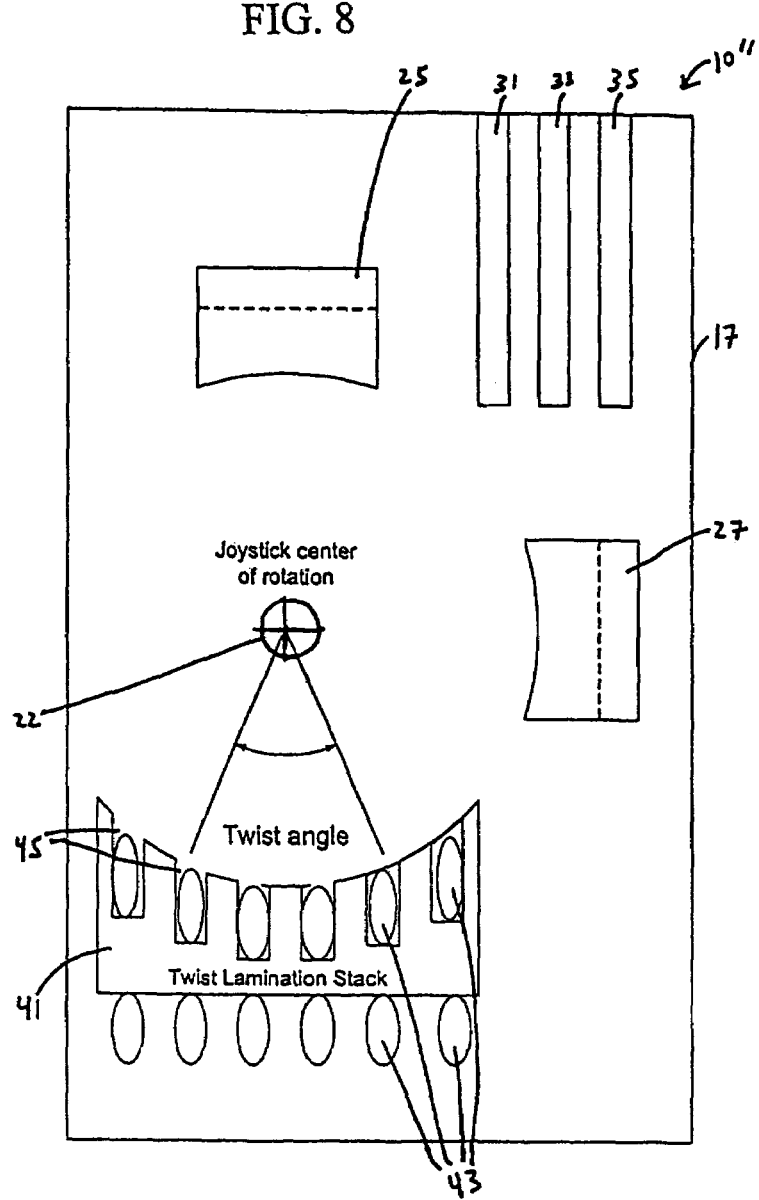
FIG. 8 is a plan schematic view of another embodiment of an exemplary motor assembly consistent with the invention, comprising an additional lamination stack to provide a third degree of freedom.

With reference now to FIG. 8, an additional embodiment of the invention is illustrated in which a third degree of freedom is provided. As shown, this embodiment is substantially similar to the embodiment illustrated in FIGS. 2-4, with the additional provision of a third lamination stack 41 with a third set of coils 43 for controlling twist/rotation of the shaft 22 of the handle 20 (not shown) about its center of rotation. In this configuration, the third lamination stack 41 may have a spherical or pseudo-spherical inner surface with parallel vertical slots 45. As with the other two lamination stacks 25, 27, the third lamination stack 41 comprises a plurality of laminations, preferably identical, all stacked flat against each other (parallel to each other), and the laminations near the edge of the stack are disposed slightly closer to the shaft 22 of the handle 20 to form a stepped concave surface about the rotational axis of the output shaft 22. Torque control can be established for the rotational axis by selecting and providing a given polarity/direction and magnitude of current through the third set of coils 43. Appropriate circuitry (not shown) is thus provided for selectively energizing the third set of coils 43, thereby causing the shaft 22 of the handle 20 to rotate. In this embodiment, as can be seen in FIG. 8, an elongated housing may be provided to accommodate the third lamination stack 41.

There is thus provided a motor assembly that is capable of providing output in two or more degrees of freedom. The motor is simple and efficient in design and can be adapted for a variety of applications including joystick applications. The direct drive configuration eliminates the requirement for a transmission subsystem. A control handle or joystick can easily be disposed in a corner of the housing, rather than in its center, which may be advantageous in certain applications. The small minimum grip height of the handle or joystick is suitable when the assembly is used in physically small spaces and/or is disposed at both the left- and right-hand sides of a user. The two-arm rocker design provides low effective rotor inertia. Three degrees of freedom may be provided with only a slight elongation of the housing. The coil winding technique eliminates the need for coil commutation, thus saving both space and cost of materials. The elimination of several elements required in the prior art (e.g., the reduction in the number of control circuits, lamination stacks, and coils required) permits a compact packaging for a motor assembly consistent with the invention. In a joystick application, the motor assembly provides the input characteristics of an ordinary DC motor, without any of the disadvantages of a DC motor.

The embodiments described herein, however, are but some of the several which utilize this invention and are set forth here by way of illustration but not of limitation. For example, although a motor consistent with the invention can provide output in multiple degrees of freedom, it would be possible to operate the motor in only one degree of freedom by providing or energizing only a single coil. Another example of use of the invention is replacement of the joystick with a mirror; the mirror can then be tilted in two degrees of freedom for scanning or alignment purposes. Also, a wide variety of gimbal arrangements may be provided for pivotally supporting the stick to maintain an air gap between the stator and rotor. Yet other embodiments may be made without departing materially from the spirit and scope of the invention as defined in the appended claims.

What is claimed is:

1. A multiple degree-of-freedom motor comprising:
   an output shaft;
   a stator comprising first and second lamination stacks, each said lamination stack having an interior curved surface and a coil wound thereon, said lamination stacks being disposed asymmetrically adjacent said output shaft, wherein at least one of said lamination stacks is without a lamination stack on an opposing side of said output shaft; and
   a rotor fixed to said output shaft and movably supported adjacent said stator with an air gap disposed between said rotor and said stator, said rotor including at least one magnet disposed thereon, the magnet being movable along said interior curved surface of said lamination stacks in directions defining at least first and second degrees of freedom;
   wherein energization of the coil of said first lamination stack establishes a first magnetic field to urge said output shaft to rotate in a first plane, and wherein energization of the coil of said second lamination stack establishes a second magnetic field to urge said output shaft to rotate in a second plane substantially orthogonal to the first plane.

2. The motor of claim 1, wherein said first degree of freedom is substantially perpendicular to a longitudinal axis of wires of one of said coils associated with the first degree of freedom, and said second degree of freedom is substantially perpendicular to a longitudinal axis of wires of the other of said coils.

3. The motor of claim 1, wherein said interior curved surface substantially defines at least a portion of a sphere.

4. The motor of claim 1, wherein said curved interior surface is uniformly curved.

5. The motor of claim 1, wherein said interior curved surface has a plurality of slots formed therein.

6. The motor of claim 5, wherein said slots lie in planes substantially parallel to one another.

7. The motor of claim 1, wherein at least one said lamination stack comprises a plurality of laminations radially disposed about a center point, with a plane of each lamination extending through said center point.

8. The motor of claim 1, wherein at least one said lamination stack has an interior curved surface with no slots formed therein.

9. The motor of claim 1, wherein at least one said magnet is a permanent magnet.

10. The motor of claim 1, wherein at least one said magnet is faceted.

11. The motor of claim 1, wherein the output shaft is also an input shaft.

12. The motor of claim 11, further comprising at least one sensor for detecting movement of said input shaft.

13. The motor of claim 1, further comprising a cooling fan.

14. The motor of claim 1, further comprising a communications interface for providing input and/or output signals to detect and/or control the position of said output shaft.

15. The motor of claim 1, wherein said stator further comprises a third lamination stack having an interior curved surface and a coil wound thereon;
wherein said third lamination stack comprises laminations substantially orthogonal to a plurality of laminations that form said first and second lamination stacks;
wherein said rotor includes at least one magnet disposed thereon and being movable along said interior curved surface of said third lamination stack in a direction defining a third degree of freedom;
wherein energization of the coil of said third lamination stack establishes a third magnetic field to urge said output shaft to rotate in a third plane substantially orthogonal to each of said first and second planes.

16. The motor of claim 15, wherein said third lamination stack has slots formed therein, said slots lying in planes substantially parallel to one another.

17. A multiple degree-of-freedom motor comprising:
an output shaft;
first and second stator coils disposed asymmetrically adjacent said output shaft, wherein at least one of said stator coils is without a stator coil on an opposing side of said output shaft;
a rotor fixed to said output shaft and movably supported adjacent said stator coils with an air gap disposed between said rotor and said stator coils, said rotor including at least one magnet disposed thereon and being movable in directions defining at least first and second degrees of freedom;
wherein energization of the first stator coil establishes a first magnetic field to urge said output shaft to rotate in a first plane, and wherein energization of the second stator coil establishes a second magnetic field to urge said output shaft to rotate in a second plane substantially orthogonal to the first plane.

18. The motor of claim 17, wherein said first degree of freedom is substantially perpendicular to a longitudinal axis of wires of said first stator coil associated with the first degree of freedom, and said second degree of freedom is substantially perpendicular to a longitudinal axis of wires of said second stator coil.

19. The motor of claim 17, wherein at least one said magnet is a permanent magnet.

20. The motor of claim 17, wherein at least one said magnet is faceted.

21. The motor of claim 17, wherein the output shaft is also an input shaft.

22. The motor of claim 21, further comprising at least one sensor for detecting movement of said input shaft.

23. The motor of claim 17, wherein said stator further comprises a third coil oriented orthogonal to said first and second coils;
wherein said rotor includes at least one magnet disposed thereon and being movable in a direction defining a third degree of freedom;
wherein energization of the third stator coil establishes a third magnetic field to urge said output shaft to rotate in a third plane substantially orthogonal to each of said first and second planes.

24. A method of moving an output shaft in multiple degrees of freedom, said method comprising:
disposing first and second stator coils adjacent said output shaft, wherein at least one of said stator coils is without a stator coil on an opposing side of said output shaft;
fixing a rotor to said output shaft, said rotor being movably supported adjacent said stator coils with an air gap disposed between said rotor and said stator coils, said rotor including at least one magnet disposed thereon and being movable in directions defining at least first and second degrees of freedom; and
urging said output shaft to rotate in one of a first and second plane by respectively energizing the first or second stator coil, wherein said energization of the respective stator coils establishes magnetic fields to urge said output shaft to rotate in planes substantially orthogonal to one another.

25. The method of claim 24, wherein at least one said magnet is faceted.

26. The method of claim 24, further comprising:
disposing a third stator coil adjacent said output shaft oriented orthogonal to said first and second coils;
fixing said rotor so as to include at least one magnet disposed thereon and being movable in a direction defining a third degree of freedom; and
urging said output shaft to rotate in a third plane by energizing the third stator coil, wherein said energization of the third stator coil establishes a third magnetic field to urge said output shaft to rotate in a third plane substantially orthogonal to each of said first and second planes.

27. A multiple degree-of-freedom motor comprising:
an output shaft;
a rotor coupled to the output shaft, the rotor having multiple degrees of freedom; and
a stator comprising a first lamination stack and a second lamination stack, said lamination stacks disposed perpendicular to one another, each lamination stack having a curved interior surface facing the rotor and a coil wound thereon; and wherein the laminations of the first lamination stack and second lamination stack are substantially parallel to one another and asymmetrically adjacent to said output shaft, wherein at least one of said lamination stacks is without a lamination stack on an opposing side of said output shaft.

28. The motor of claim 27, wherein energization of the coil of the first lamination stack establishes a first magnetic field to urge said output shaft to rotate in a first plane, and wherein energization of the coil of the second lamination stack establishes a second magnetic field to urge said output shaft to rotate in a second plane.

29. The motor of claim 27, wherein said stator further comprises a third lamination stack having an interior curved surface and a coil wound thereon;
   wherein the laminations of the first and second lamination stacks are substantially perpendicular to the laminations of the third lamination stack; and
   wherein energization of the coil of the third lamination stack establishes a third magnetic field to urge said output shaft to rotate in a third plane substantially orthogonal to said first and second planes.

30. A multiple degree-of-freedom motor comprising:
   an output shaft;
   first and second stator coils disposed asymmetrically adjacent said output shaft, wherein at least one of said stator coils is without a stator coil on an opposing side of said output shaft, each said stator coil being a spiral coil having a plurality of turns therein, wherein said spiral coil is disposed adjacent said output shaft and is wound around an axis generally parallel to the longitudinal axis of said output shaft;
   a rotor fixed to said output shaft and movably supported adjacent said stator coils with an air gap disposed between said rotor and said stator coils, said rotor including at least one magnet disposed thereon, the magnet being movable in directions defining at least first and second degrees of freedom;
   wherein energization of the first stator coil by providing current in one direction establishes a magnetic field to urge said output shaft to rotate in a first plane in a clockwise direction, and energization of the first stator coil by providing current in the opposite direction establishes a magnetic field to urge said output shaft to rotate in said first plane in a counter-clockwise direction;
   and wherein energization of the second stator coil by providing current in one direction establishes a magnetic field to urge said output shaft to rotate in a second plane in a clockwise direction, and energization of the second stator coil by providing current in the opposite direction establishes a magnetic field to urge said output shaft to rotate in said second plane in a counter-clockwise direction.

31. The motor of claim 30, wherein said second plane is substantially orthogonal to said first plane.

32. A multiple degree-of-freedom motor comprising:
   an output shaft movable in directions defining at least first and second degrees of freedom and having a rotor coupled thereto;
   at least one magnet integral with the rotor; and
   first and second stator coils disposed asymmetrically adjacent said output shaft, wherein at least one of said stator coils is without a stator coil on an opposing side of said output shaft, each said stator coil being a spiral coil having a plurality of turns therein, wherein said spiral coil is disposed adjacent said output shaft and is wound around an axis generally parallel to the longitudinal axis of said output shaft;
   wherein energization of the first stator coil by providing current in one direction establishes a magnetic field to urge said magnet to rotate in a first plane in a clockwise direction, and energization of the first stator coil by providing current in the opposite direction establishes a magnetic field to urge said magnet to rotate in said first plane in a counter-clockwise direction;
   and wherein energization of the second stator coil by providing current in one direction establishes a magnetic field to urge said magnet to rotate in a second plane in a clockwise direction, and energization of the second stator coil by providing current in the opposite direction establishes a magnetic field to urge said magnet to rotate in said second plane in a counter-clockwise direction.

33. A multiple degree-of-freedom motor comprising:
   an output shaft;
   a stator comprising first and second lamination stacks, each said lamination stack having an interior curved surface and a coil wound thereon, said lamination stacks being disposed asymmetrically adjacent said output shaft, whereby each of said lamination stacks is without a complimentary, similarly positioned lamination stack on an opposing side of said output shaft;
   a rotor fixed to said output shaft and movably supported adjacent said stator with an air gap disposed between said rotor and said stator, said rotor including at least one magnet disposed thereon, the magnet being movable along said interior curved surface of said lamination stacks in directions defining at least first and second degrees of freedom; and
   a cooling fan,
   wherein energization of the coil of said first lamination stack establishes a first magnetic field to urge said output shaft to rotate in a first plane, and wherein energization of the coil of said second lamination stack establishes a second magnetic field to urge said output shaft to rotate in a second plane substantially orthogonal to the first plane.

34. The motor of claim 33, wherein said first degree of freedom is substantially perpendicular to a longitudinal axis of wires of one of said coils associated with the first degree of freedom, and said second degree of freedom is substantially perpendicular to a longitudinal axis of wires of the other of said coils.

35. The motor of claim 33, wherein said interior curved surface substantially defines at least a portion of a sphere.

36. The motor of claim 33, wherein said curved interior surface is uniformly curved.

37. The motor of claim 33, wherein said interior curved surface has a plurality of slots formed therein.

38. The motor of claim 33, wherein said slots lie in planes substantially parallel to one another.

39. The motor of claim 33, wherein at least one said lamination stack comprises a plurality of laminations radially disposed about a center point, with a plane of each lamination extending through said center point.

40. The motor of claim 33, wherein at least one said lamination stack has an interior curved surface with no slots formed therein.

41. The motor of claim 33, wherein at least one said magnet is a permanent magnet.

42. The motor of claim 33, wherein at least one said magnet is faceted.

43. The motor of claim 33, wherein the output shaft is also an input shaft.

44. The motor of claim 43, further comprising at least one sensor for detecting movement of said input shaft.

45. The motor of claim 33, further comprising a communications interface for providing input and/or ouiput signals to detect and/or control the position of said output shaft.

46. The motor of claim 33, wherein said stator further comprises a third lamination stack having an interior curved surface and a coil wound thereon;

wherein said third lamination stack is substantially orthogonal to said first and second lamination stacks;

wherein said rotor includes at least one magnet disposed thereon and being movable along said interior curved surface of said third lamination stack in a direction defining a third degree of freedom;

wherein energization of the coil of said third lamination stack establishes a third magnetic field to urge said output shaft to rotate in a third plane substantially orthogonal to each of said first and second planes.

47. The motor of claim 46, wherein said third lamination stack has slots formed therein, said slots lying in planes substantially parallel to one another.

* * * * *